United States Patent [19]  [11] 4,057,498
Vidilles  [45] Nov. 8, 1977

[54] CONCENTRATORS FOR RECOVERING LIQUID POLLUTANT FLOATING ON THE SURFACE OF A SHEET OF WATER

[76] Inventor: Jacques Vidilles, 24, Bd Maillot, 92200 Neuilly, France

[21] Appl. No.: 663,540

[22] Filed: Mar. 3, 1976

[30] Foreign Application Priority Data

Mar. 6, 1975 France .............................. 75.07031

[51] Int. Cl.$^2$ .............................................. E02B 15/04
[52] U.S. Cl. ...................................... 210/170; 61/1 F; 210/DIG. 25; 210/242 S
[58] Field of Search ................. 210/83, 242, DIG. 25, 210/170; 61/1 F

[56] References Cited

U.S. PATENT DOCUMENTS

| 3,523,611 | 8/1970 | Fitzgerald | 210/242 |
| 3,653,510 | 4/1972 | Fitzgerald | 210/242 |
| 3,664,505 | 5/1972 | Buttingham | 210/242 |
| 3,771,662 | 11/1973 | Muramatsu et al. | 210/DIG. 25 |
| 3,779,385 | 12/1973 | Strohecker | 210/242 |
| 3,815,742 | 6/1974 | Dubouchet | 210/DIG. 25 |

FOREIGN PATENT DOCUMENTS 1,528,855   5/1968   France .......................... 210/DIG. 25

Primary Examiner—Theodore A. Granger
Attorney, Agent, or Firm—Lerner, David, Littenberg & Samuel

[57] ABSTRACT

This invention relates to a concentrator for the recovery of a water-immiscible liquid pollutant floating on the surface of a sheet of water, which comprises a duct of flexible material having an inlet orifice with a larger and a small dimension along mutually perpendicular axes for locating with its larger dimension substantially parallel to the surface of the sheet of water, the shape of the duct varying along its length such that at its end remote from the inlet orifice it has a section with a larger and a smaller dimension along mutually perpendicular axes, its larger dimension being in a plane substantially perpendicular to the surface of the sheet of water when the larger dimension of the inlet orifice is parallel to the surface of the sheet of water, and at least one outlet orifice for the outflow of the liquid pollutant from the concentrator, and to systems using such concentrators.

11 Claims, 15 Drawing Figures

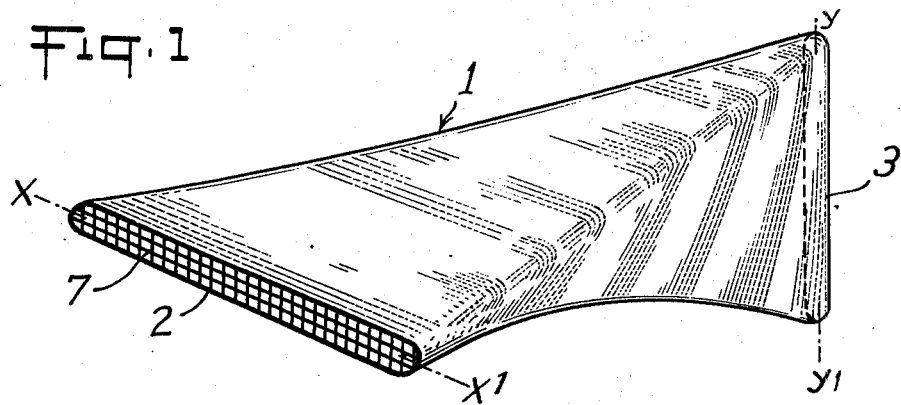
Fig. 1
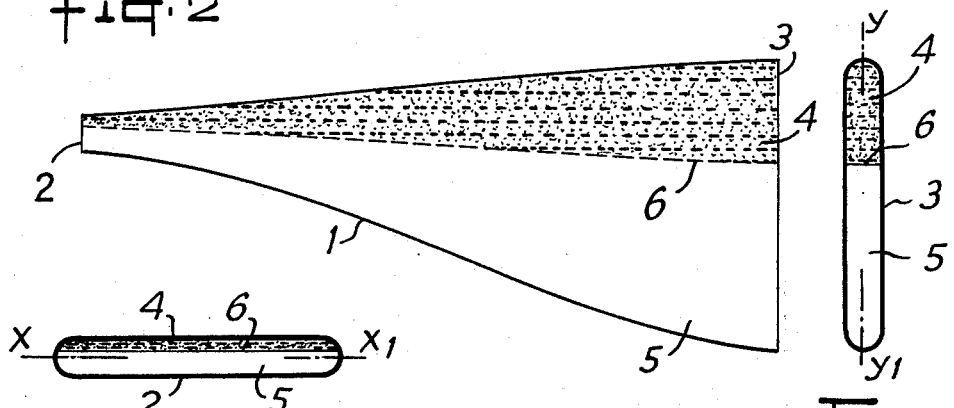
Fig. 2
Fig. 3
Fig. 4
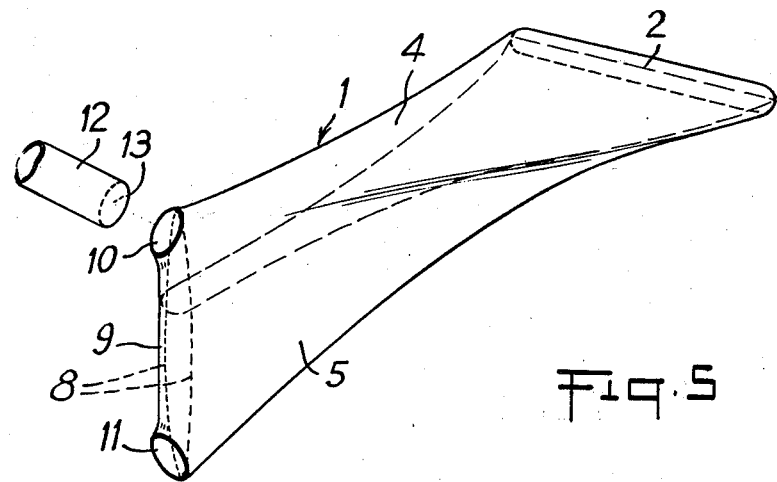
Fig. 5

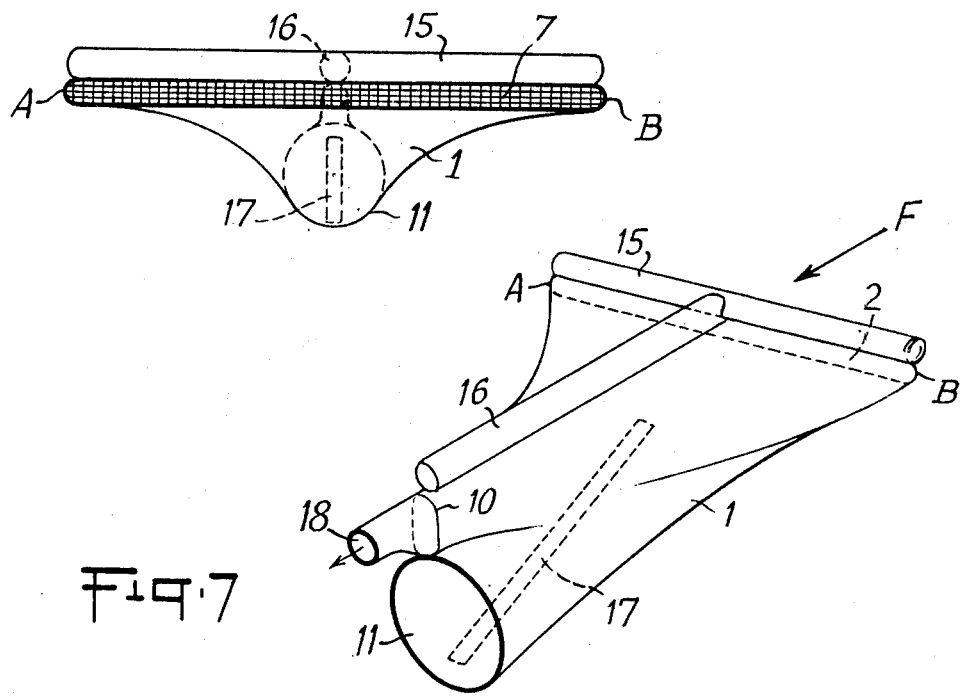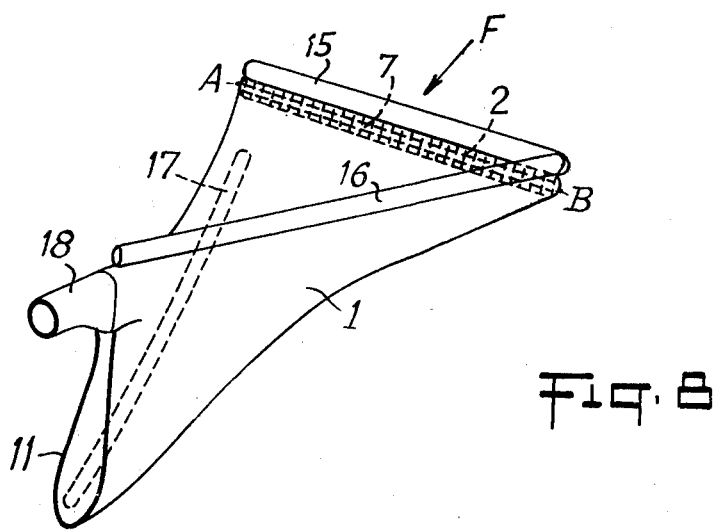

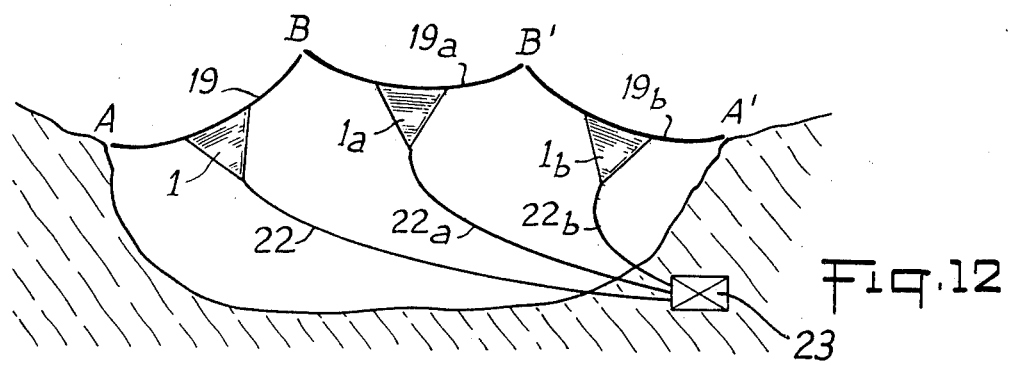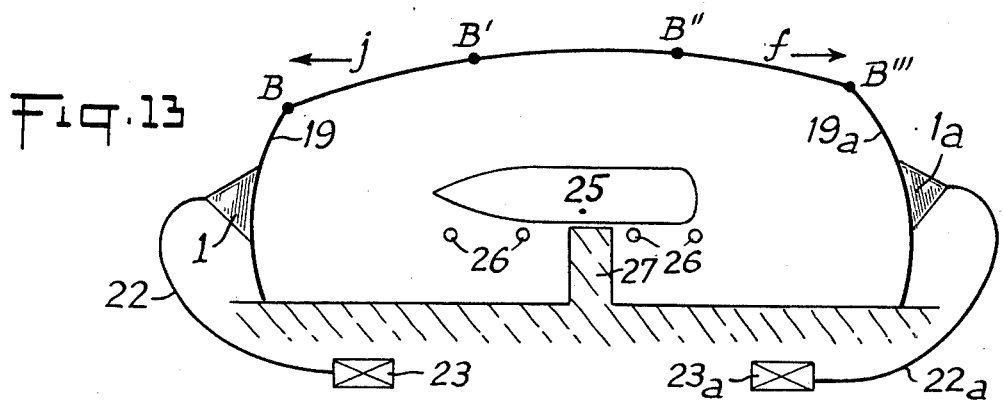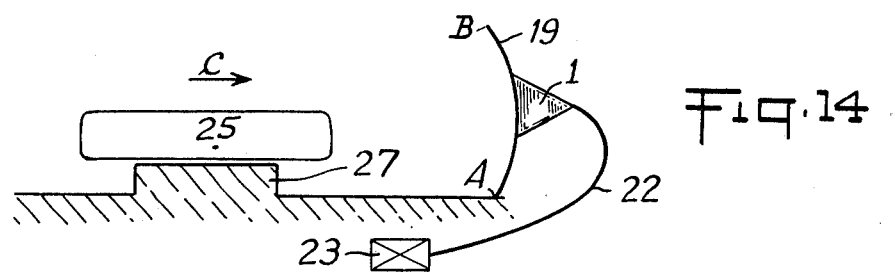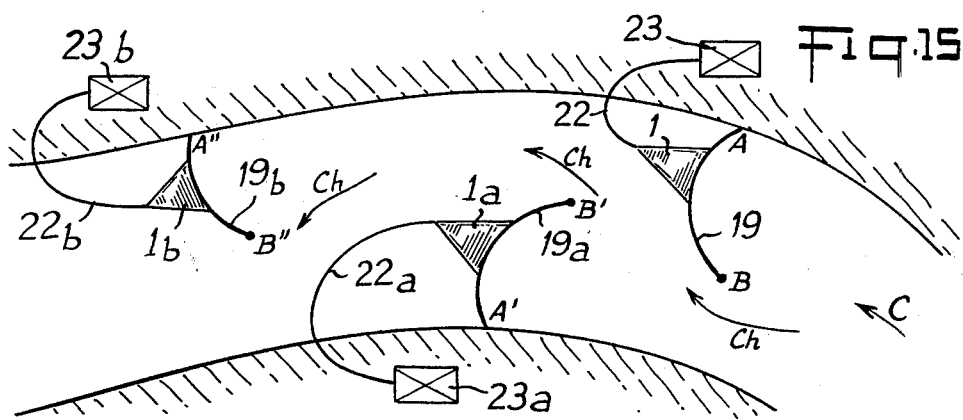

CONCENTRATORS FOR RECOVERING LIQUID POLLUTANT FLOATING ON THE SURFACE OF A SHEET OF WATER

This invention relates to the recovery of liquid pollutants floating on the surface of a sheet of water.

It has been proposed hitherto to use a floating, flexible dam to confine slicks of liquid pollutants. However, it is rare in practice for such dams to remain motionless relative to a mass of water, and usually they are subjected to a current, for example in two situations:

In the first situation where protection of a site against accidental pollution is to be provided, the dam has to be moored at a precise spot. When this is in a river site, a coastal site, or a harbour site influenced by tides, which is the most frequent situation, relative movements occur between the liquid mass (i.e. pollutant and water) and the dam.

In the second situation, which is more a question of strong motivation than of a perfected technique, a pollutant slick is trawled by towing the dam by its ends so that a pocket is formed, thereby reducing the area of the slick with a view to recovering the pollutant when the slick has thickened substantially. Here again, relative movement occurs between the dam and the liquid mass.

Many hitherto proposed dams tend to allow substantial amounts of material to escape from a slick as soon as the dams are moved at a speed of 1 to 2 knots. Such dams are, therefore, of restricted value and it is extremely rare that dam-slick combinations can be allowed to drift with water currents. In order to allow them to drift, such dams must be closed on themselves in liquid-tight manner, which itself introduces operational constraints.

Other hitherto proposed dams have a skirt which scoops instead of yielding. However, such dams require considerably more power to tow than in the so-called trawling manner, which indicates that their retaining capacity is greater than that of a dam with a skirt which yields when the dam is moved.

These hitherto proposed dams are unable to check slick when the water current is substantial, unless, in order to check a certain amount of pollutant, considerably larger amounts of water than hitherto are also retained by the dams. This would, however, make trawling a slick difficult, at least as presently envisaged.

In other words, in the above situations it is necessary to expend unacceptably large amounts of energy in order to tow a slick retained in an enclosure formed by such dams.

However, it is also possible to use a method similar to that used for trawling for fish in which the pollutant is removed from the surface of the water during trawling. In this case, the dam separates the pollutant from the water, and does not carry or stop it.

Rigid concentrators (also known as separators, skimmers, etc.) have been proposed for such methods, but they are heavy, cumbersome and costly, and moreover they are particularly ill-suited to a marine environment. Indeed, since rigid bodies unlike flexible bodies, are unable to change shape with swell, they return stresses imposed by the swell. Moreover, such concentrators are very heavy and they therefore have substantial inertias. For these reasons, the efficiency of rigid separators decreases considerably when there is swell, as they are unable to follow the movement of the swell and therefore allow pollutant to escape.

Moreover, these rigid concentrators connot be transported rapidly to an area where they are required, since speed requires the use of a light and fast vessel.

According to the present invention there is provided a concentrator for the recovery of a water-immiscible liquid pollutant floating on the surface of a sheet of water, which comprises a duct of flexible material having an inlet orifice with a larger and a smaller dimension along mutually perpendicular axes for locating with its larger dimension substantially parallel to the surface of the sheet of water, the shape of the duct varying along its length such that at its end remote from the inlet orifice it has a section with a larger and a smaller dimension along mutually perpendicular axes, its larger dimension being in a plane substantially perpendicular to the surface of the sheet of water when the larger dimension of the inlet orifice is parallel to the surface of the sheet of water, and at least one outlet orifice for the outflow of the liquid pollutant from the concentrator.

The present invention further provides a system for the protection of a coastal site against pollution, the system comprising a plurality of concentrators according to the present invention arranged in the sea so that a pollutant approaching the coastal site moves towards the inlet orifice of the concentrators, each concentrator being connected to an adjacent concentrator by a skirt for guiding the pollutant towards an associated concentrator and preventing the pollutant from reaching the coastal site, and the final concentrator at each end of the plurality being connected to a point on the coastal site by a skirt for guiding pollutant towards the associated concentrator.

The invention yet further provides a system for the protection of a waterway against pollution, the system comprising a concentrator according to the present invention, and a skirt connecting the concentrator to a bank of the waterway and to securing means in the waterway, the skirt serving to guide pollutant in the waterway towards the inlet orifice of the concentrator.

Using a concentrator embodying the invention, a strip of water and liquid pollutant, initially wide and of small height, is made narrow and high. The shape of the duct of the concentrator between the inlet orifice and the outlet orifice is generally of little importance, so the duct can be either cylindrical or conical. Indeed it can be advantageous for the duct to have a substantial degree of conicity, as will be explained hereinafter.

The ducts of concentrators in accordance with the present invention preferably have an upper outlet orifice for the removal of pollutant liquid and a lower outlet orifice for the removal of water. Concentrators in accordance with the invention which are triangular in plan view preferably have floats and ballast which impose vertical forces thereon. Preferably, two floats are disposed in the form of a V with the base of the V being close to the upper outlet orifice. Likewise, the ballast is preferably situated plumb with the floats and in a similar pattern.

Concentrators in accordance with the present invention are flexible. One result is that they can be constructed in various sizes using simple methods of construction, and they can be adapted to various situations which may occur, either out at sea or in a harbour or a river area.

In particular, and unlike rigid concentrators, they will usually have extremely low inertias, which, together with their flexibility, enables them to react immediately to swell. This results in efficiency on rough sheets of water. Another result of flexibility is that concentrators embodying the invention can be used over substantially greater widths than most hitherto proposed skimmers, while being capable of being folded away into a small volume. Transport and launching are thereby considerably simplified, and the concentrators can, therefore, be used from small, fast vessels. A flexible construction also enables the cross-section of the lower outlet orifice to be self-adjusting. As a consequence, the two standard variable factors for rigid dynamic concentrators, i.e. the translation rate and the pumping rate, are still available, and also self-adjustment.

Concentrators in accordance with the invention can therefore be used with greater flexibility than hitherto proposed rigid devices. A wide range of sizes of concentrator is therefore unnecessary.

Concentrators in accordance with the present invention do not need to be primed, since, in use, an upper part thereof is in general held at water level, due to:

dynamic pressures on the concentrators and the inertia of the liquid mass result from movement of the concentrators; and the suction effect caused by opposing forces due to floats and ballast. This effect only occurs naturally at the time of filling, which it accordingly facilitates.

Concentrators in accordance with the present invention can be included in hitherto proposed floatable, flexible dams. However, it is particularly preferred to use a floating dam as described in French patent application No. 73/29908 dated 16th Aug. 1973. It is also preferred to use a dam with a skirt having a profile with a draught which increases from upstream to downstream thereof. Flexible skirts preferably require that main traction stresses are exerted at their lower ends, so such stresses do not stretch the flexible material substantially.

A concentrator in accordance with the present invention is preferably situated in a wall of a skirt so that the pollutant to be recovered preferentially flows therethrough. A suitable opening has a width greater than its height, the opening being situated as close as possible to the water line. In practice, the opening is preferably situated just below a float, which in general is only slightly immersed.

In using a concentrator embodying the present invention, both trawling speed and the distance between traction means for trawling the concentrator can be varied. These two variables do not have the same effect. In practice, it is preferable to use a reduced speed, in the case of a very thick slick, to restrict the flow to pumping means situated downstream of the concentrator or, in the case of a very thin slick to limit turbulence due to too great a concentration ratio.

For the sake of example, if a 5 mm thick slick is worked upon with the distance between the traction means being 40 meters, and if the concentrator is moving at a speed of 16.7 metres per minute, i.e. approximately 0.54 knot, approximately 200 tons of slick will be recovered per hour. If the outlet of the concentrator has a width of 4 meters, material from the slick will go through the outlet at a thickness of 5 centimeters.

The outlet should enable material from the slick to flow on a priority basis because a second concentration stage, which has been described, is situated downstream thereof.

It is desirable that material of the slick should not escape below the skirt of the concentrator, which could occur after a certain period if this outlet were unable to remove all the material presented thereto. It is therefore necessary for the height of this outlet to be greater than the thickness of the product that is going to run up to it.

For example, a height of 200 mm is generally acceptable for an opening with a width of 4 meters, account being taken of the new concentration ratio which the second stage achieves.

Neglecting charge losses, the theoretical flow rate through an openiing of $4 \times 0.2$ meter moved at 0.54 knot is 800 tons per hour, and most recent pollutions have rarely exceeded 1000 tons.

As the opening is of a flexible material, it is important that it has a substantially constant geometry, and that floating solids are prevented from entering, and that traction stresses generated by the presence of the concentrator are distributed.

Concentrators embodying the present invention will now be described, by way of example, with reference to the accompanying diagrammatic drawings in which:

FIG. 1 is a perspective view of one concentrator embodying the invention;

FIG. 2 is a side elevation of the concentrator of FIG. 1;

FIG. 3 is a front view of the inlet orifice of the concentrator of FIG. 1;

FIG. 4 is a rear view of the outlet orifice of the concentrator of FIG. 1;

FIG. 5 is a perspective view of another concentrator embodying the invention and having two outlet orifices;

FIG. 6 is a front view of another concentrator embodying the invention;

FIG. 7 is a perspective view of the concentrator of FIG. 6;

FIG. 8 is a perspective view of a further concentrator embodying the invention;

FIGS. 11 to 15 are plan views showing various methods of using concentrators embodying the present invention.

Figure 9:
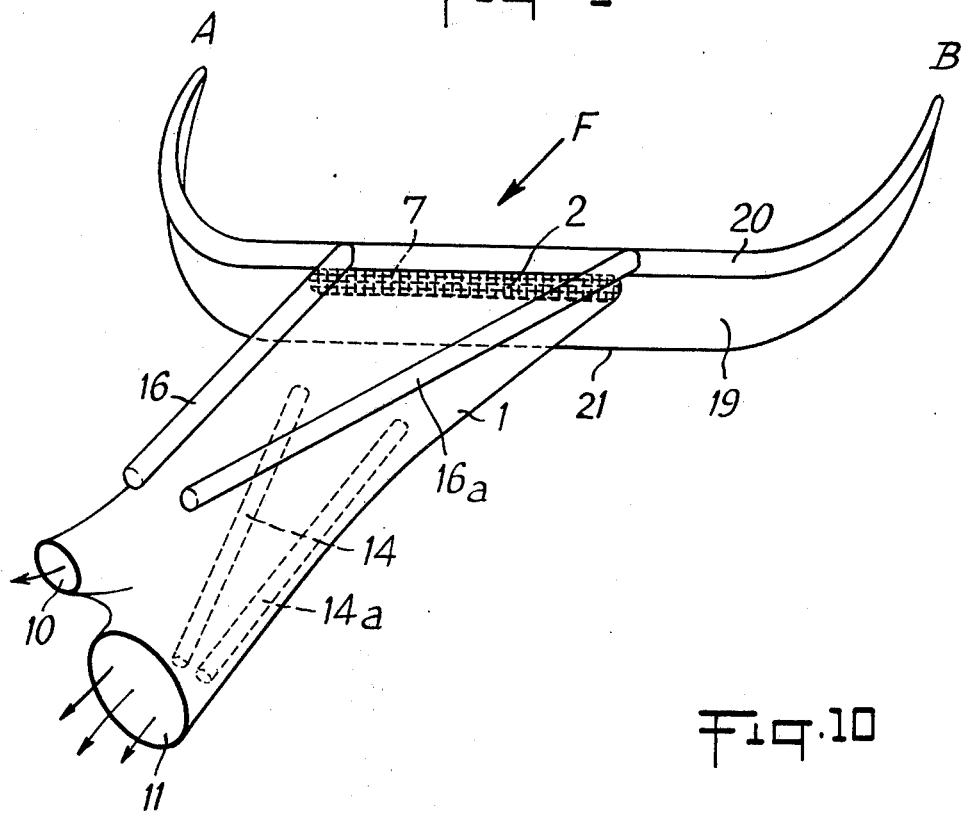
FIG. 9 is a perspective view of a yet further concentrator embodying the invention associated with a free-surface concentration member.

FIGS. 1, 2, 3 and 4, show a concentrator in accordance with the invention having a duct 1 of a flexible material with an inlet orifice 2 having an axis $X-X_1$ corresponding to its greater dimension substantially parallel to the surface of a sheet of water. Duct 1 has a shape which changes so that it has an outlet orifice 3 downstream of orifice 2, with an axis $Y-Y_1$ corresponding to its greater dimension in a plane substantially perpendicular to the surface of the sheet of water.

Duct 1 is manufactured from a fabric coated with an elastomer or plastomer, and it can have a certain conicity, or a constant section.

FIGS. 2, 3 and 4 show the inlet orifice 2 and the outlet orifice 3 with the product 4 to be recovered therein, the product being lighter than water 5. An interface 6 is situated between product 4 and water 5.

The inlet orifice 2 has a greater width than height, and it admits the two liquids in a thin but wide strip. The outlet orifice 3, which is perpendicular to orifice 2, allows the two liquids to leave duct 1 with a small width and a great height or thickness. The interface 6 between the two liquids 4 and 5 in the outlet orifice 3 (FIG. 4) is at the same height relative to orifice 3 as it is in inlet orifice 2. The result is that the thickness of the liquid 4 is multiplied by virtue of the position of outlet orifice 3 relative to inlet orifice 2 by the ratio of width to the height of the latter.

If, for example, orifice 2 in FIG. 3 has a width of 2 meters and a height of 10 centimeters, orifice 3 will have a width of 10 centimeters and a height of 2 meters. These two dimensions are therefore in a ratio of 20:1. Accordingly, if the thickness of the liquid 4 is 3 centimeters at inlet orifice 2, this thickness will be increased to 60 centimeters at the outlet orifice 3 (FIG. 4).

FIG. 2 shows that the strip of liquid 4 which enters inlet orifice 2 thickens as it travels downstream of duct 1 and as the cross-section thereof is deformed, but it retains a constant thickness relative to the cross-section of the duct.

The inlet orifice 2 has grid 7 consisting of a net preferably a mesh of synthetic fibres made up of strands of suitable strength. This net is connected by known means to the periphery of orifice 2, and in particular by shackles embedded into straps which may or may not be coated, but are vulcanised, glued or stitched onto the walls of duct 1.

This flexible grid 7 serves various purposes. It enables the geometry of orifice 2, which is of a coated and therefore, deformable fabric, to be maintained. Furthermore, it prevents floating solids of too large a size from entering duct 1.

The downstream end of duct 1 can be provided with the shape shown in FIG. 1 by one of two methods. A first method consists of fixing a rigid member having a desired outline and perimeter on the downstream end of duct 1 using hitherto proposed means, the part being a plate having two orifices, one at the top for the recovery of liquid 4 and the other at the bottom for the escape of water 5. The rate of flow then determines the operation of the device.

Another method is to use a cross-sectional shape not identical to that of the inlet orifice but an approximation thereto which nevertheless provides the described result. The downstream end can be closed in a similar way to a flexible storage tank, by bringing the edges of duct 1 together and superimposing them to obtain a so-called pillow pattern. This closure should be in a vertical plane, with two orifices.

Such a concentrator is represented in FIG. 5, in which duct 1 has, as hereinbefore described, a horizontal inlet orifice 2 through which the liquid 4 and water 5 flow.

A rear portion 8 of duct 1, which corresponds approximately to the shape of the outlet orifice 3 of FIG. 1, is closed to form a joint 9 with an upper outlet orifice 10 for the removal of liquid 4, and a lower outlet orifice 11 for the removal of water 5.

Liquid 4 is pumped through pipe 12, which, with the aid of a connection 13, adapts itself to the upper outlet orifice 10.

FIGS. 6 and 7 show a flexible concentrator embodying the invention having a duct 1, and an inlet orifice 2 above which is a linear sausage-shaped float 15 holding orifice 2 permanently in the immediate vicinity of the surface of the sheet of water 5. The float 15 remains deformable, in particular because it is inflated to a very low pressure. As a result float 15 and orifice 2 with which it is associated are deformed with swell.

A linear float 16 is attached to the top of duct 1, and it extends longitudinally of duct 1 and perpendicular to float 15. Float 16 is in the vertical plane of symmetry of duct 1. A ballast element 17 on a bottom portion of duct 1 is in the same plane of symmetry.

At the rear of duct 1 is an upper outlet orifice 10 for liquid to be recovered, and a lower outlet orifice 11 for the removal of water, the latter being of a larger cross-sectional area than orifice 10.

This concentrator can be drawn by or moored at ends A and B of orifice 2, with a water current in the direction of arrow F substantially perpendicular to the plane of orifice 2.

As liquid flows into duct 1, its cross-section is deformed, which thickens the liquid to be removed as it moves downstream to orifice 10, above which is a strainer 18.

Intake becomes efficient if the upstream face of strainer 18 is narrow and high, that is substantially in conformity with that which would characterise orifice 2 after a rotation of the latter in a vertical plane through 90°.

In general, the shape of the cross-section of the lower outlet orifice below the product/water interface is unimportant, and can therefore be as desired.

Strainer 18 can be rigid, in particular bowl-shaped, so that its section changes downstreams to end as a circle. This enables the downstream face of strainer 18 to adapt to a connection piece for a flexible suction duct for the product. This occurs for very this sheets, and, consequently, for a flow rate substantially identical to that of current F through the strainer 18 and opening 10. Under these conditions, and water/product interface is slightly above the bottom of strainer 18.

Were this not the case, it would be necessary to increase the flow rate through strainer 18, as mentioned hereinafter. The situation would then be such that the flow of water through opening 10 is a maximum, that is to say the cross-section of opening 10 would be a maximum.

Since the greatest area for a plane geometrical figure of a given perimeter is a circle, end 11 of duct 1 would then be inflated so that it is circular in cross-section. The cross-section of strainer 18 serves to compensate for low charge losses. The result is that the perimeter of end 11 of duct 1 is defined as follows, the indications being given by way of example only.

If orifice 2 has a width of 10 meters and a height of 0.2 meter, its perimeter is 20.4 meters and its cross-section of area 2 square meters. In order that orifice 10, being circular, can have a cross-section of 2 square meters, it should have a perimeter of 5 meters.

However, twice the height of strainer 18 which is set, for example, a 0.3 meter, should be added. End 11 of the duct 1 then has a perimeter close to 5.6 meters, whereas orifice 2 has a perimeter of 20.4 meters. There is therefore a substantial conicity which is favourable by a factor of four on the basis of weight, overall size, price and draught.

In the case of a thicker slick, more product enters orifice 2. The product/water interface will then be situated lower than before in duct 1 and strainer 18, so that it is supersaturated. The result is that product flows through opening 10 if none of the parameters is modified.

However it is sufficient to increase the pumping rate through strainer 18, which causes a pressure drop downstream of duct 1.

Since the concentrator is submerged, it is subjected to ambient hydrostatic pressure which immediately compensates for this reduction in pressure, until a new equilibrium of forces results, with a corresponding change in shape since the concentrator is deformable. The result is that lower outlet orifice 10 is defomed to reduce its cross-sectional area.

The precise shape of orifice 10 is unimportant provided, however, that all points on its perimeter remain below the bottom of the upstream portion of strainer 18, which is the purpose of ballast 17.

It will therefore be seen that this permanent search for balance provides an advantage for this flexible construction. In other words, at no extra expense, an opening of variable geometry can be obtained which serves to optimise the behaviour of the concentrator.

FIG. 8 shows another concentrator embodying the invention, having a profile which differs from that in FIGS. 6 and 7, in that float 16 is perpendicular to end B of float 15.

Such a concentrator can be advantageously used to dam a waterway, since it enables float 16 and strainer 18 to be kept along a bank. Its use can be facilitated by using much shorter flexible ducting, because it permits freeing traffic by simply deflating float 15 and allowing immersion of that portion of the concentrator which encroaches upon the waterway.

Concentrators with this profile can be used in particular where strong currents exist, but sheets of considerable thickness should be used.

In the case of a thin slick, the concentrator preferably has a free-surface concentration member upstream thereof.

Figure 10:
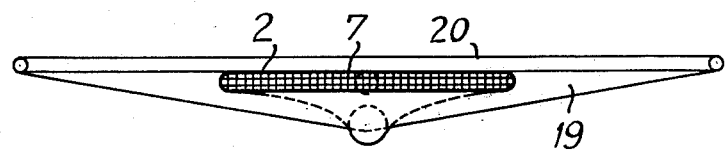
FIG. 10 is a front view of the concentrator of FIG. 9 in the direction of arrow F.

FIG. 9 shows such a member, which is subjected to the action of current F. It consists of a flexible skirt 19, such as is used in flexible dams, with a sausage-like linear float 20 at its upper side and ballast 21 on its bottom. Skirt 19 can be of a shape as shown in FIG. 10, its height decreasing from a central portion towards its ends, as described in French patent application No. 73/29908.

Attached to ends A and B of skirt 19 are cables (not shown) which permit the ends of the concentrator to be drawn at the same speed, or, in the presence of a current F, they enable the concentrator to be moored to buoys connected to anchor buoys or floating anchors.

Skirt 19 then assumes a concave shape, as in the case of a flexible dam, to form a pocket having an opening in the centre thereof and corresponding with inlet orifice 2 of duct 1 of the concentrator which is situated downstream of skirt 19. The opening in skirt 19 is horizontal, and it is preferably just below float 20 so that it is in the vicinity of the surface and preferentially admits the liquid pollutant on the sheet of water. As before, orifice 2, which corresponds to the outlet of the concentrator member, has a grid 7.

Duct 1 has two floats 16 and 16a on an upper portion thereof, the floats being in V formation and connected to float 20. A bottom portion of duct 1 has ballasts 14 and 14a, which are also in V formation. Both liquid pollutant and water are admitted through orifice 2, and they are separated in duct 1 in the manner described hereinafter.

Methods using concentrators in accordance with the invention will now be described, by way of example only.

FIGS. 11, 12, 13, 14 and 15, which are all diagrammatic plan view of various possible methods of use, show a curve representing the respective skirts 19 and a triangle 1 which represents the respective ducts of the concentrators. Suction piping preferably of floating type, is represented at 22, with pumping systems at 23.

Figure 11:
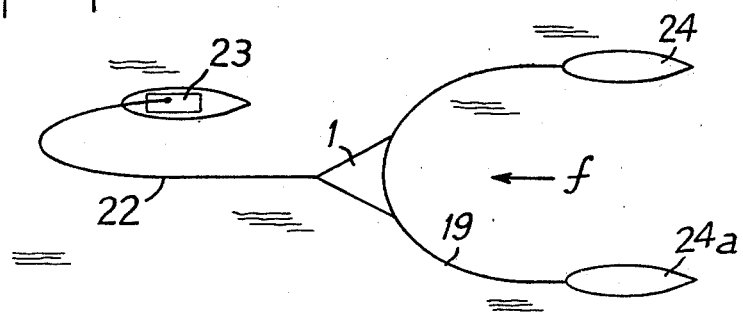

FIG. 11 represents a trawling operation, in the precise sense of the term, out at sea or on any other sheet of water. Ends A and B of the concentrator are towed along parallel paths by two ships 24 and 24a. Liquid pollutant removed by piping 22 is sucked by pumping system 23 on board a third vessel. If a trawler with a floating flexible tank is used, it is unnecessary to provide other vessels, due to equipment on the trawler.

FIG. 12 shows a method of protecting a coastal site between points A and A'. Between points A and A', and in particular depending on their distance apart, are a number of double-stage concentrators in accordance with the invention. The concentrators are joined together at points B and B' which represent buoys connected to anchoring buoys. Piping, such as 22a, 22a and 22b, is connected to the pumping system 23 which may, if need be, be set up on the coast.

FIG. 13 represents a method of protecting a mole for unloading tankers. A tanker 25 is moored to mole 27 by mooring buoys 26. Unloading sites of this type are usually situated in docks open to the tides, so that they are subjected to flood-tides and to ebb-tides. The associated currents are respectively represented on FIG. 13 by arrows $f$ and $j$. Such sites are often subjected to prevailing winds, and in the event that pollution occurs by discharge of product, the product is subjected to the wind and/or the current. It is then possible to use two-stage concentrators in accordance with the invention, so that they are automatically operational in the most likely conditions prevailing at the site.

Alternatively, all the mooring buoys corresponding to the various situations which may occur can be arranged. As a function of the conditions on any particular day, the concentrator can be placed between two buoys which suit the prevailing conditions.

A third possibility, which corresponds more nearly to FIG. 13, consists of locating two concentrators according to the flood and ebb tides, and connecting the two ends facing out to sea by dam elements such as BB', B'B" and B"B'". As indicated hereinbefore, the use of dam elements assumes that relatively strong currents are not involved, or in any case that the direction of the current is not too close to perpendicular to the length of the dam.

FIG. 14 shows a method of protecting a river site during unloading of petroleum products. A constant current $c$ is present so that the position of the concentrator can be determined once and for all.

A self-propelled vessel 25 is moored to a quayside 27, and the concentrator is downstream thereof and fixed to the bank at A, and to a buoy B. For coming-alongside, which is more conveniently performed against the current, the mooring rope to buoy B can be slipped when the vessel passes. However, it is preferable to use a sinkable concentrator as illustrated in FIG. 8.

FIG. 15 shows three concentrators in accordance with the invention situated in staggered relation on a bend in a river. The concentrators are orientated in a suitable direction relative to current $c$. and are disposed such that a slick of pollutant drifting with the current will enter their area of influence. They are arranged so that river traffic follows channel C$h$.

It should be noted that if concentrators are to be installed along a straight stretch of river, a similar effect to that in FIG. 15 can be achieved using two concentrators.

The concentrators used in FIGS. 11, 12, 13, 14 and 15 can also be single-stage concentrators as illustrated in FIGS. 1, 5 and 6.

Various alternations or additions can be made by those skilled in the art to the concentrators and methods which have just been described, without departing from the scope of the present invention.

I claim:

1. A concentrator for the recovery of a water-immiscible liquid pollutant floating on the surface of a sheet of water, which comprises a duct of flexible material having an inlet orifice with a larger and a smaller dimension along mutually perpendicular axes for locating with its larger dimension substantially parallel to the surface of the sheet of water, the shape of the duct varying across its length such that at its end remote from the inlet orifice it has a section with a larger and a smaller dimension along mutually perpendicular axes, its larger dimension being in a plane substantially perpendicular to the surface of the sheet of water when the larger dimension of the inlet orifice is parallel to the surface of the sheet of water, a flexible grid connected across the inlet orifice so as to maintain a fixed geometry of said inlet orifice, at least one outlet orifice for the outflow of the liquid pollutant from the concentrator, a tubular coupling connected to the outlet orifice for the liquid pollutant for recovery of the pollutant therefrom by pumping, an upper transverse float extending the length of the inlet orifice, and at least one float extending the length of the duct, the cross-sectional area of said duct being substantially constant between the inlet and outlet orifices.

2. A concentrator according to claim 1, wherein the outlet orifice for the outflow of the liquid pollutant is arranged in an upper portion of the duct, and the duct has a lower outlet orifice for the removal of water.

3. A concentrator according to claim 2, wherein the lower outlet orifice has a greater cross-sectional area than the outlet orifice for the liquid pollutant.

4. A concentrator according to claim 1, having a float extending longitudinally of the duct and symmetrically of the inlet orifice, the float having one end terminating in a centre portion of the transverse float.

5. A concentrator according to claim 1, wherein the float extending the length of the duct is asymmetric of the inlet orifice with one end at an end of the transverse float.

6. A concentrator according to claim 1, having a ballasting element in a bottom portion of the duct.

7. A concentrator according to claim 1, having a concentration member upstream of the duct with a free surface consisting of a flexible skirt with a float member at its top and a ballast member at its bottom, the skirt being in the shape of a horizontal pocket with ends connected to traction means and having a bottom portion with an opening therein surrounding and connected to the inlet orifice of the duct downstream thereof.

8. A concentrator according to claim 7, wherein the duct has two floats in V formation at the top thereof, the floats of the duct being joined to the float of the skirt on either side of the inlet orifice and adjacent thereto.

9. A system for the protection of a coastal site against pollution, the system comprising a plurality of concentrators according to claim 1 arranged in the sea so that a pollutant approaching the coastal site moves towards the inlet orifice of the concentrators, a plurality of intermediate skirts each connecting a concentrator to an adjacent concentrator and guiding the pollutant towards as associated concentrator to prevent the pollutant from reaching the coastal site, and a pair of final skirts each connecting the final concentrator at a respective end of the plurality of concentrators to a point on the coastal site, each final skirt guiding pollutant towards the associated final concentrator.

10. A system for the protection of a waterway against pollution, the system comprising a concentrator according to claim 1, and a skirt extending outward from both ends of said inlet orifice, said skirt at one end thereof connecting the concentrator to a bank of the waterway and at the other end thereof to securing means in the waterway, the skirt serving to guide pollutant in the waterway towards the inlet orifice of the concentrator.

11. A system according to claim 10, wherein the securing means is a buoy connected to a fixed point at the bottom of the waterway.

* * * * *